United States Patent [19]
Morgan

[11] 3,900,645
[45] Aug. 19, 1975

[54] SCORED ADHESIVE LAMINATE

[75] Inventor: Burton D. Morgan, Hudson, Ohio

[73] Assignee: Morgan Adhesives Company, Stow, Ohio

[22] Filed: Oct. 7, 1970

[21] Appl. No.: 78,887

Related U.S. Application Data

[62] Division of Ser. No. 689,435, Dec. 11, 1967, Pat. No. 3,570,337.

[52] U.S. Cl. .................................. 428/41; 156/247
[51] Int. Cl. .............................................. B32b 3/00
[58] Field of Search ........ 229/56, 43; 161/167, 406, 161/116, 117

[56] References Cited
UNITED STATES PATENTS

| | | | |
|---|---|---|---|
| 1,967,444 | 7/1934 | Lowe | 161/406 |
| 2,303,346 | 12/1942 | Flood | 161/406 |
| 2,608,341 | 8/1952 | Eckman | 156/257 |
| 3,006,793 | 10/1961 | Wheeler | 161/406 |
| 3,035,957 | 5/1962 | Morgan | 161/406 |
| 3,194,479 | 7/1965 | Rumberger | 229/43 |

Primary Examiner—George F. Lesmes
Assistant Examiner—R. J. Roche
Attorney, Agent, or Firm—Oldham & Oldham Co.

[57] ABSTRACT

Apparatus for scoring paper and other sheet materials which thereafter are formed into a laminate with an adhesive sheet. The scoring is not continuous but facilitates tearing the sheet at a later time to facilitate use of the laminate as a label or similar product.

4 Claims, 8 Drawing Figures

INVENTOR.
BURTON D. MORGAN
BY Oldham & Oldham
ATTORNEYS

SCORED ADHESIVE LAMINATE

This is a division of my prior Application Serial No. 689,435 filed Dec. 11, 1967, now U.S. Pat. No. 3,570,337.

Reference is made to my own prior U.S. Pat. No. 3,035,957, which discloses one type of an adhesive product with special embrittled tear zones provided therein.

This invention further relates to adhesive products such as labels, stickers, tapes and similar articles wherein the article comprises, normally, a surface sheet, a layer of adhesive secured to the back face of such surface sheet, and a removable paper backing sheet secured to the adhesive layer for ultimate removal when the label, sticker or the like is to be affixed to an article for end use purposes. It is difficult to strip labels, stickers and the like of their backing sheets to prepare them for use because no available edge of the backing sheet usually is exposed to facilitate grasping the backing sheet for its removal. U.S. Pat. No. 2,364,607 is on one adhesive tape or label of this same general type as made heretofore, but which label or laminate provided does not in many instances accept printing uniformly.

The general object of the present invention is to provide a novel and improved laminate including a surface sheet, an adhesive layer, and a scored paper backing sheet which can readily be removed.

Another object of the invention is to form scored sheets of material, such as paper backing sheets, that are used in forming adhesive laminates or the like and wherein the backing sheet of the laminate must be removed before use of the product.

The foregoing and other objects and advantages of the invention will be made apparent as the specification proceeds.

Reference now is made to the accompanying drawings in which.

When referring to corresponding members shown in the drawings and referred to in the specification, corresponding numerals are used to facilitate comparison therebetween.

Figure 1:
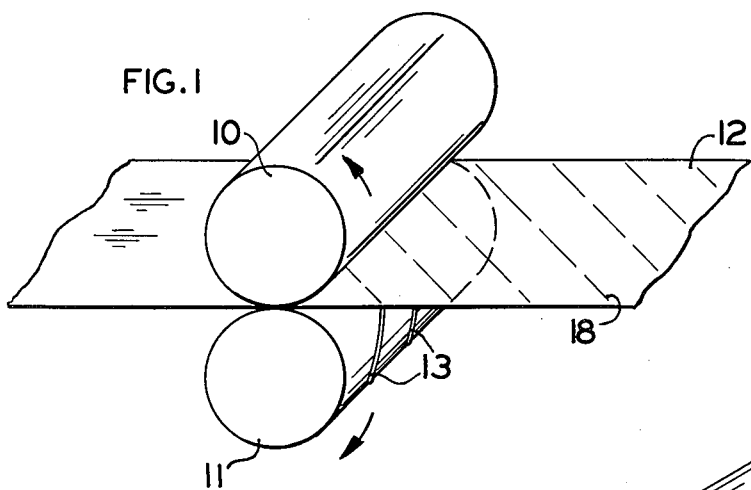
FIG. 1 is a perspective view of apparatus which is diagrammatically shown and used in forming a laminate of the invention.
Figure 2:
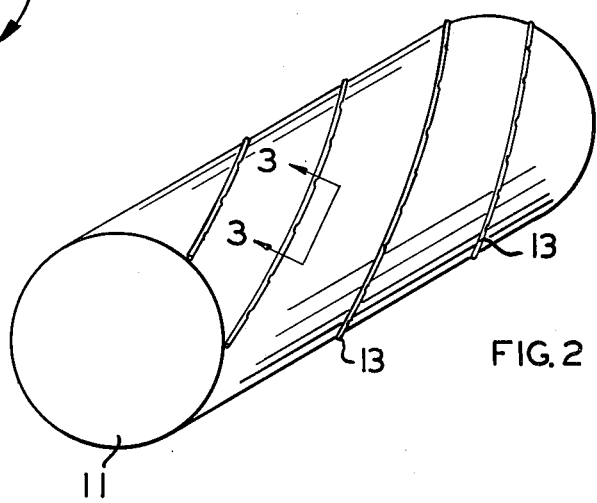
FIG. 2 is an enlarged elevation of one of the rolls of FIG. 1.
Figure 4:
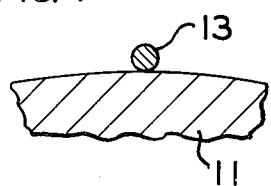
FIG. 4 is a fragmentary enlarged vertical section taken on line 4—4 of FIG. 3.

Attention now is directed to the details of the structure shown in the drawings, and a pair of rolls 10 and 11, which normally are cylindrical and are made from metal, are shown in operative association to form a roll bight therebetween. Normally, at least one of the rolls is driven whereby pressure engagement is provided at the roll bight for a sheet or strip of material 12 which will be drawn through the roll bight. Normally in the process of use of the apparatus of the invention, the sheet or strip 12 would be formed from a fibrous material, such as paper, of the type that conventionally is used for forming backing sheets in adhesive laminates. Adhesive laminates using the sheets 12 may be used for making stickers, labels or other articles therefrom. Normally the sheets 12 are quite thin such as in the range of from about 0.001 inch to about 0.005 inches in thickness.

It is an important feature of the present invention that the roll 11 has one or more metal wires 13 secured to the surface thereof. These wires 13 preferably would be made from spring steel and, for example, would have a diameter of approximately 0.010 inch but the wire thickness can be varied dependent upon the thickness of the sheets 12 being processed and the desired amount of scoring to be provided thereon. The wire or wires 13 can be secured to the periphery of the roll 11 in any desired manner, as by spot welding or otherwise securing at least the ends of the wire 13 to the metal roll 11. However, if desired, the wire 11 could be affixed to the roll by a suitable adhesive, such as a conventional epoxy type of an adhesive which will set up at room temperature or at slightly elevated temperatures in give a good bond of the wire 13 to the roll. The wires are helically positioned on the roll 11.

It is another portion of the present invention that parts of the wires 13, at longitudinally spaced sections of the wire would have complementary shaped recesses 14 formed in the surface of the roll 11 for receiving a length of the wire 13 when the rolls 10 and 11 operatively engage whereby the wire 13 will not form a continuous scored or weakened area, zone or line in the sheet 12 being processed. Intermittent lengths of the sheet 12 would not be effected at all because the wire 13 would have sufficient resilience or stretch, and would have no backing provided therefor at the longitudinally spaced portions of the wires lying over the recesses 14 so that portions of the wire will just be pushed into the recesses 14 when the rolls engage. This particular construction of the wires and rolls leaves sufficient strength in the sheet 12 whereby it can be readily further processed without any danger of splitting or tearing while being processed or prepared for use. At the same time, the recesses 14 would only be provided at, for example, intervals of 1 or 2 inches along the periphery of the roll 11, and such recesses 14 necessarily could be quite short, such as approximately ¼ to ½ inch or so.

By passing the sheet 12 through the roll bight, the fibrous material forming the sheet 12 will be crushed or weakened by a compaction of the fibres in the sheet in lineal zones or lines 18 of the sheet where the wire 13 contacts it and where the wire is backed up by the surface of the roll 11.

Figure 5:
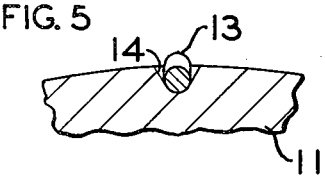
FIG. 5 is a fragmentary enlarged vertical section taken on line 5—5 of FIG. 3.
Figure 3:
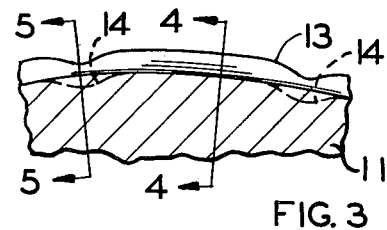
FIG. 3 is a fragmentary enlarged section taken on line 3—3 of FIG. 2.
Figure 6:
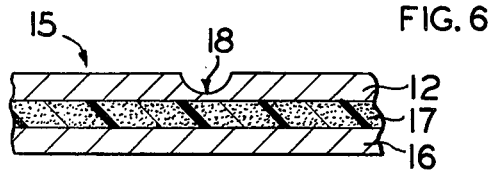
FIG. 6 is a fragmentary enlarged section of an adhesive laminate made using a sheet processed by the apparatus of FIG. 1.

FIG. 3 shows how a plurality of the small recesses 14 could be formed in the periphery of the roll for receiving longitudinally spaced portions of the wire 13 therein when the roll 11 is operative. FIG. 5 in turn indicates how this wire can be received in the recess for passing portions of the sheet 12 through the roll bight without any scoring action on spaced areas of the sheet 12.

After the sheet 12 has been processed by being fed through the roll bight between the rolls 10 and 11, then it can be thereafter treated in any conventional manner. Thus, for example, a layer of a release material of a conventional nature, such as a silicon base composition, can be applied to one surface of the sheet 12 and thereafter a laminate 15 can be made in a conventional manner and which laminate could, for example, include a surface layer 16, a layer of a conventional adhesive composition 17 attached to the layer 16, and then the release coated surface of the sheet 12 would be releasably affixed to the opposite face of the adhesive layer 17. Any desired pressure sensitive or other adhesives can be used in forming the laminate 15 and such adhesives may, for example, be of the compositions described on Page 586 of "Handbook of Adhesives" by Skeist.

Figure 7:
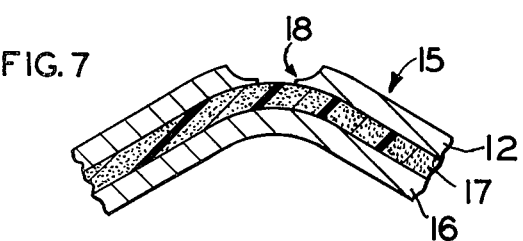
FIG. 7 shows the step of splitting the adhesive laminate of FIG. 6 along a weakened area provided in the backing sheet of the laminate.

After the laminate 15 has been fully prepared for use as by printing any desired data thereon after the laminate is made, or before the components thereof are assembled, as desired, then the laminate 15 can be cut to a desired shape, or otherwise be prepared for use. When the laminate is to be used, it is a relatively simple matter to fold or bend the laminate 15 in a direction as shown in FIG. 7 so as to tension the weakened zone or line 18 provided on the sheet 12 whereby such backing paper will split or tear along this line 18, the sheet 12 is removed, and the adhesive layer 17 can be exposed for securing the end product to a carrier surface for use. Thus, it is believed that the objects of the invention have been achieved and that a new and improved apparatus has been provided for scoring or weakening ultimate tear lines or zones in sheet material, such as paper and the like, and a new laminate is provided.

Figure 8:
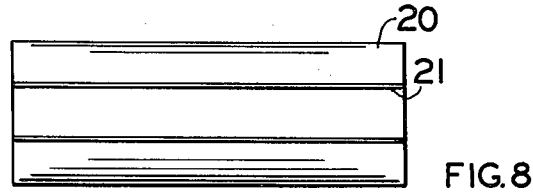
FIG. 8 is an elevation of a modified roll of the apparatus.

In some instances, it may be desirable to use a roll such as a roll 20 shown in FIG. 8 rather than the roll 11 in combination with the roll 10 for forming weakened zones, areas or lines in a processed sheet of material. The roll 20 has wires 21 secured thereto similar to the wires 13. In this instance, however, the wires 21 may extend axially of the roll 20 inasmuch as the sheet material processed between the rolls 20 and 21 will still have sufficient strength for processing and handling even though spaced score lines or zones are provided in sheets of material processed between the rolls.

While several complete embodiments of the invention have been disclosed herein, it will be appreciated that modification of these particular embodiments of the invention may be resorted to without departing from the scope of the invention as defined in the appended claims.

What is claimed is:

1. A flexible laminate for use as a label, decal or the like, comprising
   a face sheet,
   a layer of pressure sensitive adhesive secured to the back surface of said face sheet, and
   a fiber paper backing layer removably secured to said adhesive layer and having a reduced thickness potential tear line formed in such material, the fibers of the paper backing layer being appreciably compacted at the potential tear line, the paper having a release coating on its inner surface which engages the adhesive layer.

2. A laminate as in claim 1 where said backing sheet is weakened at said tear line.

3. A laminate as in claim 1 where the paper backing layer is less than one-half of its uncompacted thickness at said potential tear line.

4. A laminate as in claim 3 where the compaction of said paper layer is from its outer surface to provide a recess at said potential tear line on the outer surface of said paper layer.

* * * * *